(12) United States Patent
Peng et al.

(10) Patent No.: US 9,456,415 B2
(45) Date of Patent: Sep. 27, 2016

(54) PHYSICAL-LAYER CELL IDENTITY (PCI) PARTITION FOR HETEROGENEOUS NETWORKS

(75) Inventors: Yuefeng Peng, Beijing (CN); Yujian Zhang, Beijing (CN); Kamran Etemad, Potomac, MD (US); Yuan Zhu, Beijing (CN); Mo-Han Fong, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 681 days.

(21) Appl. No.: 13/538,775

(22) Filed: Jun. 29, 2012

(65) Prior Publication Data

US 2013/0083744 A1    Apr. 4, 2013

Related U.S. Application Data

(60) Provisional application No. 61/542,086, filed on Sep. 30, 2011.

(51) Int. Cl.
*H04W 48/16* (2009.01)
*H04W 52/02* (2009.01)
(Continued)

(52) U.S. Cl.
CPC ....... *H04W 52/0222* (2013.01); *H04B 7/0456* (2013.01); *H04B 7/0615* (2013.01); *H04B 7/0619* (2013.01); *H04L 5/0032* (2013.01); *H04L 5/0037* (2013.01); *H04L 45/245* (2013.01); *H04L 47/41* (2013.01); *H04W 4/06* (2013.01); *H04W 4/08* (2013.01); *H04W 28/042* (2013.01); *H04W 36/0005* (2013.01); *H04W 48/16* (2013.01); *H04W 48/18* (2013.01); *H04W 52/0235* (2013.01); *H04W 52/04* (2013.01); *H04W 72/005* (2013.01); *H04W 72/042* (2013.01); *H04W 72/082* (2013.01); *H04W 72/1215* (2013.01); *H04W 72/1278* (2013.01); *H04W 72/1294* (2013.01); *H04W 76/048* (2013.01); *H04W 76/064* (2013.01); *H04B 7/0613* (2013.01); *H04L 12/189* (2013.01); *H04L 25/0204* (2013.01); *H04W 28/10* (2013.01); *H04W 48/12* (2013.01); *H04W 52/244* (2013.01); *H04W 52/365* (2013.01); *H04W 52/54* (2013.01);
(Continued)

(58) Field of Classification Search
None
See application file for complete search history.

(56) References Cited

U.S. PATENT DOCUMENTS

| 8,588,139 | B2  | 11/2013 | Etemad |         |
|-----------|-----|---------|--------|---------|
| 8,843,139 | B2* | 9/2014  | Yu et al. | 455/444 |

(Continued)

OTHER PUBLICATIONS

3GPP: 3rd Generation Partnership Project; Technical Specification Group radio Access network; Evolved Universal Terrestrial Radio Access (E-UTRA); Physical Channels and Modulation; 3GPP TS 36.211 v10.1.0; Mar. 2011; 103 pages; Release 10.

(Continued)

*Primary Examiner* — Timothy J Weidner
(74) *Attorney, Agent, or Firm* — Thorpe North & Western LLP

(57) ABSTRACT

Technology for partitioning small cell physical-layer cell identities (PCI) at a node in a heterogeneous network (HetNet) is disclosed. One method can include the node identifying at least one small cell PCI of a plurality of small cells in a macro cell. Each small cell PCI can be associated with a low power node (LPN) in the HetNet. The node can generate a small cell PCI list to include the at least one small cell PCI. The node can broadcast the small cell PCI list to a wireless device.

27 Claims, 6 Drawing Sheets

Figure 1:
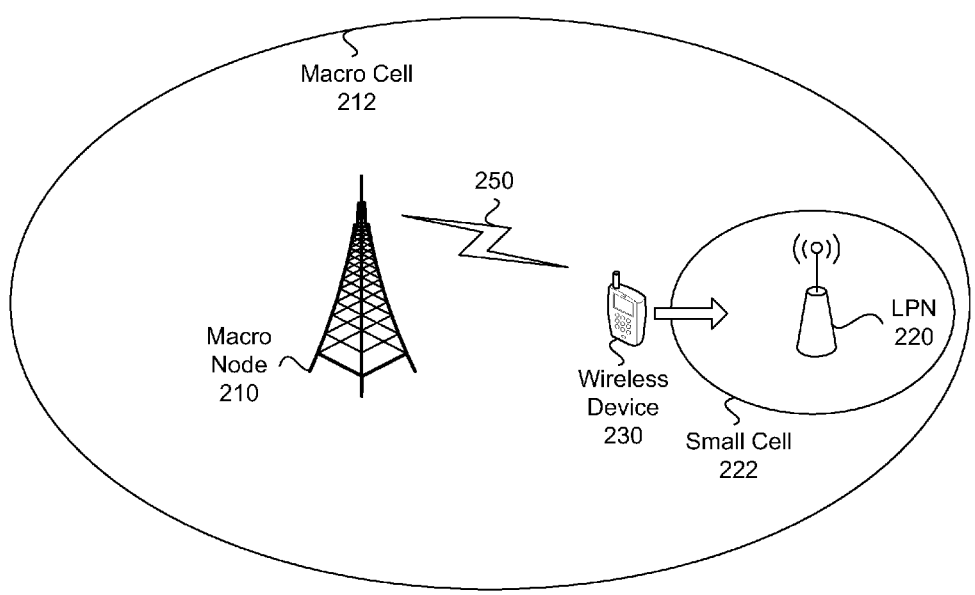

(51) Int. Cl.

| | |
|---|---|
| *H04B 7/06* | (2006.01) |
| *H04B 7/04* | (2006.01) |
| *H04L 12/891* | (2013.01) |
| *H04W 52/04* | (2009.01) |
| *H04L 5/00* | (2006.01) |
| *H04W 72/04* | (2009.01) |
| *H04W 4/08* | (2009.01) |
| *H04W 36/00* | (2009.01) |
| *H04W 28/04* | (2009.01) |
| *H04W 4/06* | (2009.01) |
| *H04W 72/00* | (2009.01) |
| *H04W 72/12* | (2009.01) |
| *H04W 76/04* | (2009.01) |
| *H04L 12/709* | (2013.01) |
| *H04W 48/18* | (2009.01) |
| *H04W 72/08* | (2009.01) |
| *H04W 76/06* | (2009.01) |
| *H04W 84/04* | (2009.01) |
| *H04W 52/54* | (2009.01) |
| *H04L 12/18* | (2006.01) |
| *H04L 25/02* | (2006.01) |
| *H04W 28/10* | (2009.01) |
| *H04W 52/24* | (2009.01) |
| *H04W 52/36* | (2009.01) |
| *H04W 48/12* | (2009.01) |

(52) U.S. Cl.
CPC ....... *H04W 72/0426* (2013.01); *H04W 84/042* (2013.01); *Y02B 60/50* (2013.01)

(56) References Cited

U.S. PATENT DOCUMENTS 9,107,182 B2\* 8/2015 Kwun .................. H04W 72/00
9,204,354 B2\* 12/2015 Chen .................... H04W 36/30
2012/0264440 A1\* 10/2012 Koskela et al. ............. 455/450

OTHER PUBLICATIONS

3GPP: 3rd Generation Partnership Project; Technical Specification Group Radio Access Network; Evolved Universal Terrestrial Radio Access (E-UTRA); Radio Resource Control (RRC); Protocol specification; 3GPP TS 36.331 v10.1.0; Mar. 2011; 290 pages; Release 10.

\* cited by examiner

```
SmallCellPhysCellIdRange ::=    SEQUENCE {
    start                           PhysCellId,
    range                           ENUMERATED {
                                        n2, n3, n4, n5, n6, n7, n8, n9, n10,
                                        n12, n14, n16, n20, n24, spare2,
                                        spare1}              OPTIONAL   -- Need OP
}
```

FIG. 2

```
-- ASN1START

SystemInformationBlockType4 ::=    SEQUENCE {
    intraFreqNeighCellList              IntraFreqNeighCellList      OPTIONAL,   -- Need OR intraFreqBlackCellList              IntraFreqBlackCellList      OPTIONAL,   -- Need OR
    csg-PhysCellIdRange                 PhysCellIdRange             OPTIONAL,   -- Cond CSG
    ...,
    intraFreqNeighSmallCellPhysCellIdList  PhysCellIdList  OPTIONAL,  -- Need OR
    lateNonCriticalExtension            OCTET STRING                OPTIONAL    -- Need OP
}

IntraFreqNeighCellList ::=      SEQUENCE (SIZE (1..maxCellIntra)) OF IntraFreqNeighCellInfo IntraFreqNeighCellInfo ::=      SEQUENCE {
    physCellId                          PhysCellId,
    q-OffsetCell                        Q-OffsetRange,
    ...
}

IntraFreqBlackCellList ::=      SEQUENCE (SIZE (1..maxCellBlack)) OF PhysCellIdRange
PhysCellIdList ::=  SEQUENCE (SIZE (1..maxCellIntra)) OF PhysCellId

-- ASN1STOP
```

FIG. 3

PHYSICAL-LAYER CELL IDENTITY (PCI) PARTITION FOR HETEROGENEOUS NETWORKS

RELATED APPLICATIONS

This application claims the benefit of and hereby incorporates by reference U.S. Provisional Patent Application Ser. No. 61/542,086, filed Sep. 30, 2011.

BACKGROUND

Wireless mobile communication technology uses various standards and protocols to transmit data between a node (e.g., transmission station) and a wireless device. Some wireless devices communicate using orthogonal frequency-division multiple access (OFDMA) in a downlink (DL) transmission and single carrier frequency division multiple access (SC-FDMA) in an uplink (UL) transmission. Standards and protocols that use OFDM and SC-FDMA modulation for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with a wireless device (e.g., mobile device), known as a user equipment (UE). A downlink (DL) transmission can be a communication from the node station (or eNodeB) to the wireless device (or UE), and an uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) are used to handle the increased traffic loads on the macro nodes due to increased usage and functionality of wireless devices. HetNets can include a layer of planned high power macro nodes (or macro-eNBs) overlaid with layers of lower power nodes (micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes" or small cells. The macro node can be used for basic coverage, and the low power nodes can be used to fill coverage holes, to improve capacity in hot-zones or at the boundaries between the macro nodes' coverage areas, and improve indoor coverage where building structures impede signal transmission.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 1 illustrates a diagram of a wireless device in a macro node area moving into a small cell area in accordance with an example;

FIG. 2 illustrates a diagram of a mobility control information element (IE) SmallCellPhysCellIdRange in accordance with an example;

FIG. 3 illustrates a diagram of a radio resource control (RRC) information element (IE) system information block (SIB) type 4 with a intraFreqNeighSmallCellPhysCellIdList field in accordance with an example;

FIG. 4 depicts a flow chart of a method for partitioning small cell physical-layer cell identities (PCI) at a node in heterogeneous network (HetNet) in accordance with an example;

FIG. 5 depicts a flow chart of a method for searching a reduced number of small cell physical-layer cell identity (PCI) candidates in a search pool at a wireless device in a heterogeneous network (HetNet) in accordance with an example;

FIG. 6 illustrates a block diagram of a wireless device and a node in accordance with an example; and FIG. 7 illustrates a diagram of a wireless device in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In some scenarios, the heterogeneous network (HetNet) can provide higher capacity service to wireless devices over homogeneous networks. The HetNet can provide seamless connection and robust mobility to the wireless device from a macro cell (e.g., macro node) to a small cell (e.g., LPN) and back to the macro cell. A small cell can refer to a low power node (LPN) like a remote radio head (RRH), a pico node, a home eNB (HeNB), or a relay node.

A wireless device can use reference signals to determine when the power or quality of communication with the macro node is too low, which can indicate that communication may be transferred or handed over to another node, such as a LPN, for better communication. For example, when a primary cell's (PCell's) reference signal received power (RSRP) or reference signal received quality (RSRQ) is lower than a threshold value, the wireless device (e.g., UE)

can search physical-layer cell identities or physical cell identifiers (PCIs) from large pool of candidates (e.g., 504 PCIs in LTE) and choose one or several neighbor cells to perform measurements (e.g., RSRP or RSRQ) on. In a HetNet, the RSRP measured from a small cell can vary quickly compared with the RSRP measured from a macro cell, especially with a moving wireless device. In an example, when the wireless device is moving towards small cell, the wireless device can suffer high radio link failure rate before a small cell can be discovered, especially in cases when the wireless device moves with medium or high speed. Reducing the PCI(s) search time for nodes (e.g., small cells) in HetNets can improve wireless device connectivity as wireless device moves towards small cells.

FIG. 1 illustrates a wireless device 230 moving towards a small cell 222 in a HetNet. In a HetNet, a small cell 222 (e.g., LPN 220) can have smaller coverage compared with the macro cell 212 (e.g., 210). When the wireless device in communication 250 with the macro node moves towards the small cell (i.e., further away from the macro node with less signal strength), the PCell's RSRP or RSRQ can become lower than a threshold value (e.g., a predefined s-measure). When PCell's RSRP or RSRQ becomes lower than a threshold value, the wireless device can start searching PCIs from large number of candidates to find another node with higher RSRP or RSRQ values. Each cell (e.g., macro cell or small cell) can have a single PCI. After searching the PCI, the wireless device can select one or several neighbor cells to perform measurements (e.g. RSRP or RSRQ) on. A longer PCI search time can increase a connection drop probability with the wireless device.

Since small cells can share the same PCI space of the macro cells, the wireless device may search 504 PCIs to find small cells in a macro cell. In LTE, the PCI space can have 504 unique physical-layer cell identities (PCIs). The physical-layer cell identities can be grouped into 168 unique physical-layer cell-identity groups, where each group can contain three unique identities. The grouping can be such that each physical-layer cell identity can be part of one physical-layer cell-identity group. A physical-layer cell identity $N_{ID}^{cell}=3N_{ID}^{(1)}+N_{ID}^{(2)}$ can be uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. Stated another way, the physical cell identity $N_{ID}^{cell}$ can be defined as $N_{ID}^{cell}=3N_{ID}^{(1)}+N_{ID}^{(2)}$. $N_{ID}^{(1)}$ can be a physical layer cell identity group (0 to 167), $N_{ID}^{(2)}$ can be a identity within the group (0 to 2), creating 504 unique physical cell identities.

The primary synchronization signal (PSS) can be linked to the cell identity within the group $N_{ID}^{(2)}$. The secondary synchronization signal (SSS) can be linked to the cell identity group $N_{ID}^{(1)}$ and the cell identity within the group $N_{ID}^{(2)}$. $N_{ID}^{(2)}$ can be obtained by successfully demodulating the PSS. The SSS can then be demodulated and combined with knowledge of $N_{ID}^{(2)}$ to obtain $N_{ID}^{(1)}$. Once the values of $N_{ID}^{(1)}$ and $N_{ID}^{(2)}$ have been established the cell identity $N_{ID}^{cell}$ can be determined.

The PSS can be used in a detection of a carrier frequency, a detection of shared channel (SCH) (e.g., data channel) symbol timing, and/or an identification of a cell ID (0-2). The SSS can be used in a detection of a radio frame timing, a detection of a cell ID group (0-167) which can be combined with the cell ID to generate the PCI (e.g., cell ID group+cell ID=PCI), and/or detection of cyclic prefix (CP) configuration. In an example, the PSS and SSS can be transmitted two times in a radio frame. In another example, the detection of the PSS and SSS can take over 5 milliseconds (ms).

During the cell search, the wireless device can search for the PSS and SSS within the radio frames. On locking the PSS and SSS, the wireless device can identify the frame timing and the cell PCI. The PCI can be obtained by direct mapping from the PSS (which can represent one of three possible cell identities) and the SSS (which can represent one of 168 cell-group-identities). Once the wireless device synchronizes with a new cell, the wireless device can acquire the reference signals, which enables the wireless device to determine the received signal strength for mobility purposes, such as cell reselection and/or handover.

In an example, matched filtering can be used in the PCI search so that the received signal can be correlated with the possible sequences for the PSS. A possible sequence (e.g., a first cell IDs) can be multiplied by the received pattern, and the operation can be synchronized to a clock. A subsequent integrator can add up the signal, and if an output agrees with the checked sequence, a tested sequence can indicate the sequence used for the PSS. If the output does not agree, the next sequences (e.g., next cell ID) can be multiplied by the pattern until the output agrees. With successful matched filtering, the device can identify the physical layer identity for the cell. In a roughly similar way, a correlator can be used to match the received signal with the possible sequences (0-167) for the secondary synchronization signal (SSS) to generate the physical layer cell identity group and compute the physical cell identity (PCI). With a broadcast of a small cell PCI list and/or range. The PCI searching (e.g., PSS and SSS detection process can be reduced) prior to measuring (e.g. RSRP and RSRQ) the neighboring cells.

As stated previously, the RSRP from the small cells can change more quickly than the RSRP from the macro cells for an equivalent distance traveled by the wireless device. When the wireless device is moving towards a small cell, the wireless device can suffer serious interference from the primary interferer (i.e., an approaching target small cell), especially when the wireless device is traveling at a medium or high speed, before the macro node handovers communication to the target small cell. A reason for the large interference can be that the RSRP from the small cell may be bigger than the PCell's RSRP when the wireless device is in the search process of searching the PCIs from the large number of PCIs candidates.

Broadcasting a list and/or a range of PCIs of small cells can reduce the PCI candidates to search and help with small cell identification. In an example, the wireless device can search the list and/or range of PCIs of small cells before searching the remaining PCI candidates in the pool of available PCIs. The wireless device can include a single correlator or multiple correlators. In another example, when a wireless device has multiple correlators, the wireless device can search the PCIs of small cells with at least one correlator and remaining PCIs with at least another correlator in parallel with higher priority on a search of the small cell PCIs. At least one correlator can perform the PCI search of small cells while at least one other correlator can perform the PCI search of remaining PCIs simultaneously. With the small cell list and/or the range of PCIs, the search time for small cell PCIs can be reduced. A macro node can broadcast a list of small cell PCIs within a vicinity (e.g., a selected proximity or area) of the macro node or a list of the small cell PCIs within the macro cell. When the wireless device is moving toward a small cell with a known PCI, the wireless device can optimize measurement and/or handover related parameters, which can result in better reselection and/or handover performance. In addition, broadcasting the list of small cell PCIs to the wireless device can save battery power by skipping the cell reselection (of the PCI pool of candidates) to small cells with PCIs on the list, if the wireless device is in RRC_IDLE state and/or wireless device is moving at a high speed. In an example, the wireless device can use the small cell PCI list to skip handing over to small cells if the mobility speed is too high. With the small cell PCI list, the wireless device can use different weights on the PCIs in the small cell PCI list when performing a mobility state estimation (MSE). Using the small cell PCI list, the wireless device can use different handover parameters (e.g., different time-to-trigger (TTT) values if a handover is to small cells).

The small cell PCI list and/or range can be broadcast using various formats and/or processes. In a configuration, the small cell PCIs can be broadcast as a list of PCIs or a range of PCIs. The list can include a contiguous list or non-contiguous list of PCIs. Using a list can provide flexibility, but may incur an additional cost of signaling overhead. For example, the node (e.g., macro node or eNB) can periodically broadcasts the list of the PCI(s) of the neighboring small cells using system information blocks (SIBs) which can be transmitted on a downlink shared channel (DL-SCH). Table 1 illustrates an example small cell PCI list with neighboring small cell and their associated PCIs. The list can be included in an IE or other designator.

TABLE 1

| Neighbor Cell | PCI |
| --- | --- |
| 1 | 102 |
| 2 | 337 |
| 3 | 338 |
| 4 | 401 |
| 5 | 402 |

The list can be included in an information element (IE) or other designator.

The small cell PCIs can also be broadcast as a range. A range can use less signaling than a list and can be encoded by using a start value and by indicating the number of consecutive physical cell identities (e.g., including or excluding the start value) in the range. The small cell PCI list and/or range can be included in an information element (IE), such as a mobility control IE. For example, IE PhysCellId-Range in LTE can be used to indicate the PCI range of small cells. In the IE PhysCellIdRange, the range value can include an enumerated type with a set range elements with relatively large values (e.g., n4, n8, n12, n16, n24, n32, n48, n64, n84, n96, n128, n168, n252, n504, spare2, and spare1, where "n4" represents the start value PCI (PhysCellId) and 3 PCIs after a start value, "n8" represents the start value PCI (PhysCellId) and 7 PCIs after a start value, and so forth). Since the set of range values of the IE PhysCellIdRange may not be optimized to indicate a small number of PCIs, another IE can be used to define a small cell PCI range (e.g., IE SmallCellPhysCellIdRange) with a smaller set of range values than the IE PhysCellIdRange. FIG. 2 illustrates an example abstract syntax notation one (ASN.1) code for the IE SmallCellPhysCellIdRange, where the smaller set of range values can include a smaller increments of ranges, such as n2, n3, n4, n5, n6, n7, n8, n9, n10, n12, n14, n16, n20, n24, spare2, and spare1) which can reduce the PCI searching. The IE SmallCellPhysCellIdRange can include the range and start field descriptions. The range can indicate the number of physical cell identities in the range (including start). A value n4 can correspond with 4, n8 corresponds with 8 and so on. A UE can apply value 1 in case the field is absent, in which case the physical cell identity value indicated by start applies. The start can indicate the lowest physical cell identity in the range.

In another example, a special case of indicating PCIs in a range can be to partition PCIs to two parts as either macro cells or non-macro cell (e.g., small cells). For example, the macro cells can share two thirds of the PCIs (0-335) while the non-macro cells (e.g., small cells) can share one third of the PCIs (336-503). In the two part partitioning example, the threshold value (e.g., 335) representing the PCI partitioning can be broadcasted by the node in a SIB (without an explicit range broadcasted).

In another configuration, the small cell PCIs can be broadcasted as a number of types of small cells. For example, all types of small cells can be classed as one category (e.g., "small cells") and the node can broadcast the small cell PCI list and/or range associated with the category of small cells. In another example, small cells can be separated as several different types of small cells and the node can broadcast the list of small cell PCIs in each type separately. For example, the small cell type can be indicated abstractly (e.g., type1 or type 2) or the small cell type can be indicated concretely (e.g., pico or RRH). The wireless device operation can be defined when receiving the small cell types or detecting the small cell types. The small cell categories or types can be included in an IE, a field description, or other designator.

In another configuration, the relationship between the PCIs of small cells and a closed subscriber group (CSG) cells can be defined. A CSG cell can provide restricted access to the node by a selected number of wireless devices (e.g., users). In an example, the small cell PCIs can be exclusive to the CSG cell PCIs, so a cell can either be designated as a CSG cell or a small cell, but not both simultaneously. The PCIs of CSG cells can be broadcast in SIB type 4 (SIB4) as csg-PhysCellIdRange. For example, when an overlap of PCIs broadcast between the PCIs of small cells and the PCIs of CSG cells occur, the overlapping PCIs can be considered to belong to small cells (i.e., not CSG cells). In another example, the overlapping PCIs can be considered to belong to CSG cells (i.e., not small cells).

In another configuration, a validity time or an expiration time can be associated with the broadcasted small cell PCIs. For example, the validity time of the broadcasted small cell PCIs can last for a specified time (e.g., 24 hours). After the duration of the validity time or upon the expiration time (or before the validity time expires), the wireless device can reacquire the small cell PCI list. The time validity can place a time duration on the validity of the received small cell list. Alternatively, a validity time may not be defined, and the wireless device can consider the broadcasted small cell PCIs applicable until a different small cell PCI list is broadcasted by the node. The small cell PCI list and/or range can be broadcasted periodically to wireless devices within a macro cell.

The described configurations can be combined into various combinations. For example, FIG. 3 illustrates a radio resource control (RRC) information element (IE) system information block (SIB) type 4 (SIB4) with a intraFreq-NeighSmallCellPhysCellIdList field, where the small cell PCIs can be indicated as a list considering small cells as one type, considering overlapping SCG and small cell PCIs belonging to small cells, and not defining validity time. The SIB4 (e.g., SystemInformationBlockType4) can include a csg-PhysCellIdRange, an intraFreqBlackCellList, an intraFreqNeighbCellList, a q-OffsetCell, and an intraFreqNeighSmallCellPhysCellIdList field descriptions. The csg-PhysCellIdRange can include a set of physical cell identities reserved for CSG cells on a frequency on which the csg-PhysCellIdRange was received. The received csg-PhysCellIdRange can apply if less than 24 hours has elapsed since the csg-PhysCellIdRange was received and the csg-PhysCellIdRange was received in the same primary PLMN. A 3 hour validity restriction may not apply the csg-PhysCellIdRange. The intraFreqBlackCellList can provide a list of blacklisted intra-frequency neighboring cells. The intraFreqNeighbCellList can provide a list of intra-frequency neighboring cells with specific cell re-selection parameters. The q-OffsetCell can include the parameter "$Qoffset_{s,n}$". The intraFreqNeighSmallCellPhysCellIdList can provide a list of physical cell identities (PCIs) of the intra-frequency neighboring small cells. The PCIs overlapping with csg-PhysCellIdRange can belong to small cells. In another example, the PCIs overlapping with csg-PhysCellIdRange can belong to CSG cells.

Figure 4:
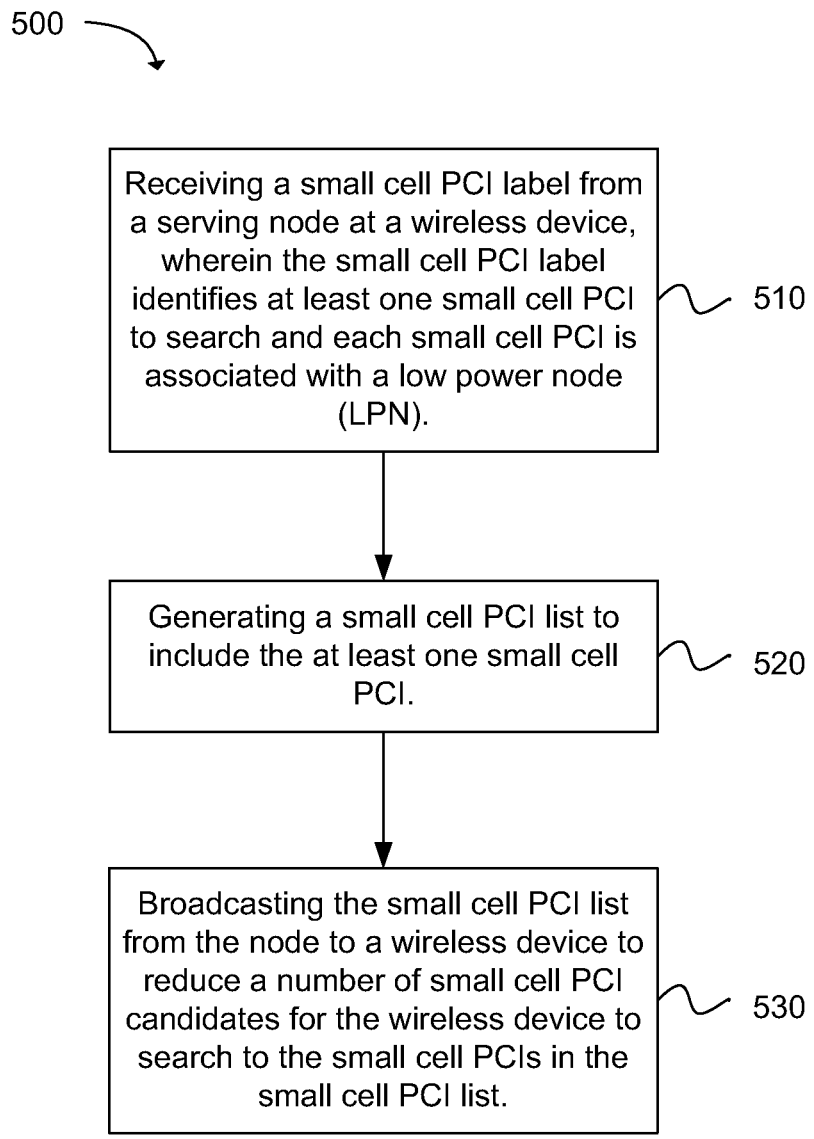

Another example provides a method 500 for partitioning small cell physical-layer cell identities (PCI) at a node in a heterogeneous network (HetNet), as shown in the flow chart in FIG. 4. The method may be executed as instructions on a machine, where the instructions are included on at least one computer readable medium or one non-transitory machine readable storage medium. The method includes the operation of identifying at a node at least one small cell PCI of a plurality of small cells in a macro cell, wherein each small cell PCI is associated with a low power node (LPN) in the HetNet, as in block 510. The operation of generating a small cell PCI list to include the at least one small cell PCI follows, as in block 520. The next operation of the method can be broadcasting the small cell PCI list from the node to a wireless device, as in block 530.

In an example, the small cell PCI list can be configured to reduce a number of small cell PCI candidates for the wireless device to search to the small cell PCIs in the small cell PCI list. The small cell PCI list can include a plurality of non-consecutive small cell PCIs or a range of consecutive small cell PCIs. In another example, the small cell PCI list can include a PCI start value for a PCI and a PCI range for a number of PCIs to search after the PCI start value. The operation of broadcasting the small cell PCI list can further include broadcasting the small cell PCI list in a mobility control information element (IE) SmallCellPhysCellIdRange or a mobility control IE PhysCellIdRange. A set of range elements of the IE SmallCellPhysCellIdRange can have smaller values than a set of range elements of an IE PhysCellIdRange. In another example, the operation of broadcasting the small cell PCI list can further include broadcasting the small cell PCI list in a radio resource control (RRC) information element (IE) master information block (MIB) type 4 configured to include a list of PCIs of intra-frequency neighboring small cells (e.g., a intraFreqNeighSmallCellPhysCellIdList). In an example, the small cell PCI list can include a small cell category value (e.g., type 1, type 2, pico, or RRH), where the small cell category value specifies the PCIs associated with a small cell type. The method can further include the node broadcasting a closed subscriber group (CSG) range to a wireless device. In an example, the small cell PCI list can include a validity time of the received small cell PCI list, where the validity time can specify an expiration time by which time to acquire an updated small cell PCI list.

Figure 5:
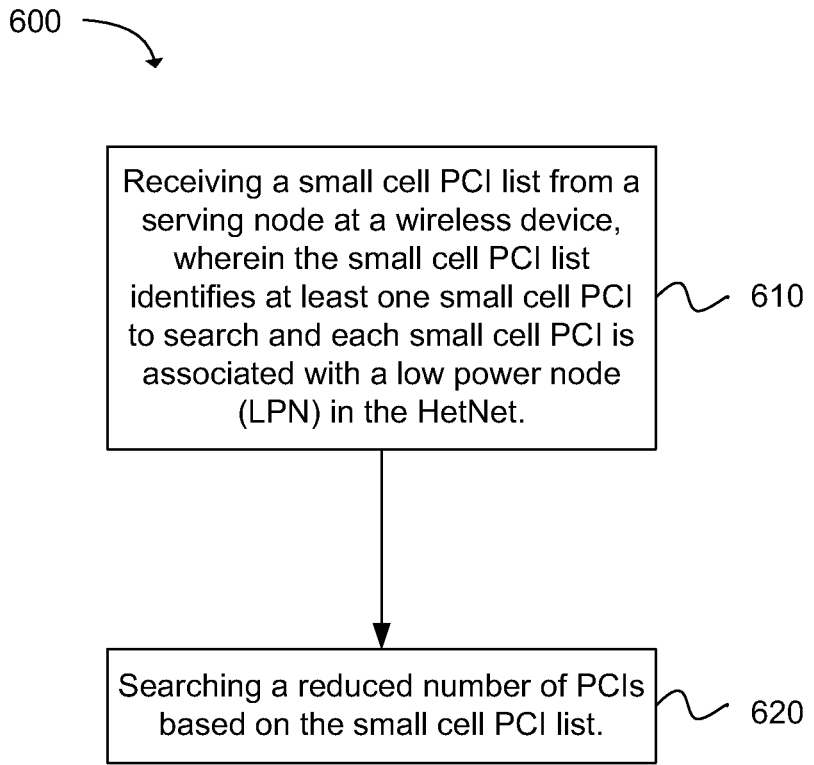

Another example provides a method 600 for searching a reduced number of small cell physical-layer cell identity (PCI) candidates in a search pool at a wireless device in a heterogeneous network (HetNet), as shown in the flow chart in FIG. 5. The method may be executed as instructions on a machine, where the instructions are included on at least one computer readable medium or one non-transitory machine readable storage medium. The method includes the operation of receiving a small cell PCI list from a serving node at a wireless device, wherein the small cell PCI list identifies at least one small cell PCI to search and each small cell PCI is associated with a low power node (LPN) in the HetNet, as in block 610. The operation of searching a reduced number of PCIs based on the small cell PCI list follows, as in block 620.

The small cell PCI list can include a plurality of non-consecutive small cell PCIs or a range of consecutive small cell PCIs. In another example, the small cell PCI list can include a PCI start value for a PCI and a PCI range for a number of PCIs to search after the PCI start value. The operation of receiving the small cell PCI list can further include receiving the small cell PCI list broadcast in a mobility control information element (IE) SmallCellPhysCellIdRange or a mobility control IE PhysCellIdRange. A set of range elements of the IE SmallCellPhysCellIdRange can have smaller values than a set of range elements of an IE PhysCellIdRange. In another example, the operation of receiving the small cell PCI list can further include receiving the small cell PCI list broadcast in a radio resource control (RRC) information element (IE) master information block (MIB) type 4 configured to include a list of PCIs of intra-frequency neighboring small cells (e.g., a intraFreqNeighSmallCellPhysCellIdList). In an example, the small cell PCI list can include a small cell category value (e.g., type 1, type 2, pico, or RRH), where the small cell category value specifies the PCIs associated with a small cell type. The method can further include the wireless device receiving a closed subscriber group (CSG) range from the serving node. The operation of searching the reduced number of PCIs can further include searching an overlap of PCIs specified in the small cell PCI list and the CSG range. In another example, the operation of searching the reduced number of PCIs can further include excluding the PCIs specified in the CSG range from the PCIs specified in the small cell PCI list in the search. The operation of searching the reduced number of PCIs can be based on a validity time of the received small cell PCI list. The validity time can specify an expiration time by which time to acquire an updated small cell PCI list. In another example, the operation of searching the reduced number of PCIs can be triggered when a primary cell's reference signal received power (RSRP) or reference signal received quality (RSRQ) falls below a specified threshold. The operation of searching the reduced number of PCIs can use a reference signal received power (RSRP) or a reference signal received quality (RSRQ) derived from a reference signal (RS), such as a primary synchronization signal (PSS) or a secondary synchronization signal (SSS).

Figure 6:
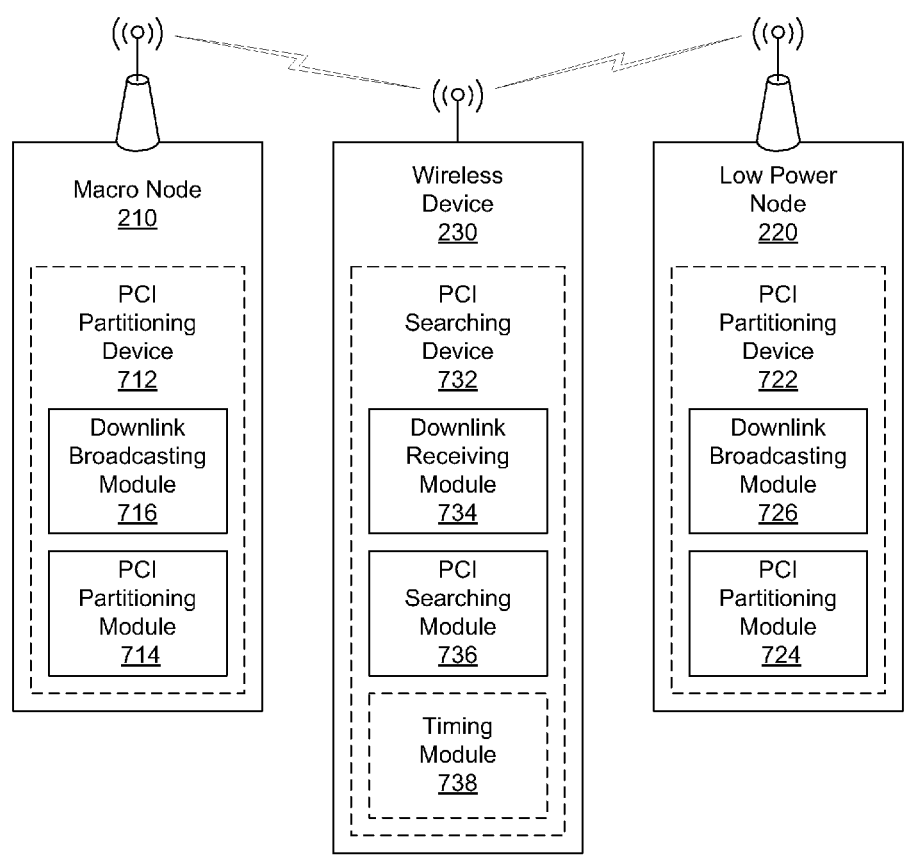

FIG. 6 illustrates example nodes and an example wireless device 730 in a heterogeneous network (HetNet). The can include a macro node 210 (e.g., macro-eNB) or a low power node 220 (e.g., micro-eNB, a pico-eNB, a femto-eNB, or a HeNB). The nodes can include a PCI partitioning device 712 and 722, and the PCI partitioning device can include a downlink broadcasting module 716 and 726 and a PCI partitioning module 714 and 724. The PCI partitioning module can be configured to identify at least one small cell PCI of a plurality of small cells in a macro cell, and generate a small cell PCI list to include the at least one small cell PCI. Each small cell PCI can be associated with a low power node (LPN) in the HetNet. The downlink broadcasting module can be configured to broadcast the small cell PCI list from the node to a wireless device. In an example, the small cell PCI list can be used to reduce a number of small cell PCI candidates for the wireless device to search to the small cell PCIs in the small cell PCI list. The small cell PCI list can include a plurality of non-consecutive small cell PCIs, a range of consecutive small cell PCIs, a PCI start value for a PCI and a PCI range for a number of PCIs to search after the PCI start value, and/or a small cell category value. The small cell category value can specify the PCIs associated with a small cell type.

The wireless device 230 (e.g., UE) can be in communication with the nodes 210 and 220 (e.g., eNB or LPN). The wireless device can include a PCI searching device 732, and the PCI searching device can include a downlink receiving module 734 and a PCI searching module 736. In an example, the PCI searching device can include a timing module 738. The PCI searching device can be configured for searching a reduced number of small cell PCI candidates in a search pool at a wireless device in a heterogeneous network (HetNet). The downlink receiving module can be configured to receive a small cell PCI list from a serving node at a wireless device. The small cell PCI list can identify at least one small cell PCI to search and each small cell PCI can be associated with a low power node (LPN) in the HetNet. The PCI searching module can be configured to search a reduced number of PCIs based on the small cell PCI list.

The small cell PCI list can include a plurality of non-consecutive small cell PCIs, a range of consecutive small cell PCIs, a PCI start value for a PCI and a PCI range for a number of PCIs to search after the PCI start value, and/or a small cell category value. The small cell category value can specify the PCIs associated with a small cell type. The downlink receiving module can be further configured to receive the small cell PCI list in a mobility control information element (IE) SmallCellPhysCellIdRange or a radio resource control (RRC) information element (IE) master information block (MIB) type 4 configured to include a list of PCIs of intra-frequency neighboring small cells. A set of range elements of the IE SmallCellPhysCellIdRange can have smaller values than a set of range elements of an IE PhysCellIdRange. In another example, the downlink receiving module can be further configured to receive a closed subscriber group (CSG) range from the serving node. The PCI searching module can be further configured to search the reduced number of PCIs by searching an overlap of PCIs specified in the small cell PCI list and the CSG range or by excluding the PCIs specified in the CSG range from the PCIs specified in the small cell PCI list in the search. In an example, the PCI searching module can be further configured to search the reduced number of PCIs after a primary cell's reference signal received power (RSRP) or reference signal received quality (RSRQ) falls below a specified threshold. The timing module can be configured to count a validity time of the received small cell PCI list. The validity time can specify an expiration time by which time to acquire an updated small cell PCI list. The wireless device can include a user equipment (UE) and a mobile station (MS). The wireless device can configured to connect to at least one of a wireless local area network (WLAN), a wireless personal area network (WPAN), and a wireless wide area network (WWAN). The wireless device can include an antenna, a touch sensitive display screen, a speaker, a microphone, a graphics processor, an application processor, internal memory, or a non-volatile memory port.

Figure 7:
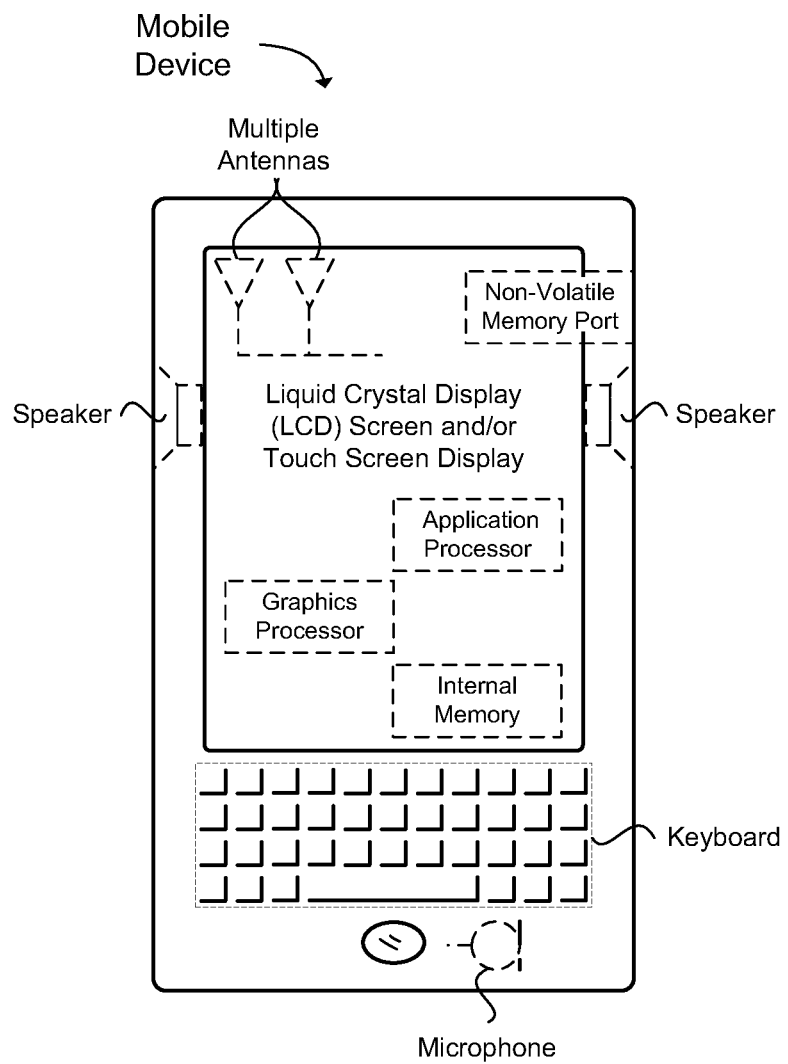

FIG. 7 provides an example illustration of the wireless device, such as a user equipment (UE), a mobile station (MS), a mobile wireless device, a mobile communication device, a tablet, a handset, or other type of mobile wireless device. The wireless device can include one or more antennas configured to communicate with a node, such as a macro node, a low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for partitioning small cell physical-layer cell identities (PCI) at a node in a heterogeneous network (HetNet), comprising:
   identifying at a node at least one small cell PCI of a plurality of small cells in a macro cell, wherein each small cell PCI is associated with a low power node (LPN) in the HetNet;
   generating a small cell PCI list to include the at least one small cell PCI;
   broadcasting the small cell PCI list from the node to a wireless device; and
   sending a closed subscriber group (CSG) range from the node to the wireless device, wherein the wireless device is configured to search a reduced number of PCIs by searching an overlap of PCIs specified in the small cell PCI list and the CSG range or by excluding the PCIs specified in the CSG range from the PCIS specified in the small cell PCI list in the search.

2. The method of claim 1, wherein the small cell PCI list includes one of:
   a plurality of non-consecutive small cell PCIs; and
   a range of consecutive small cell PCIs.

3. The method of claim 1, wherein the small cell PCI list includes a PCI start value for a PCI and a PCI range for a number of PCIs to search after the PCI start value.

4. The method of claim 1, wherein broadcasting the small cell PCI list further comprises broadcasting the small cell PCI list in a mobility control information element (IE) SmallCellPhysCellIdRange or a mobility control IE PhysCellIdRange, wherein a set of range elements of the IE SmallCellPhysCellIdRange have smaller values than a set of range elements of an IE PhysCellIdRange.

5. The method of claim 1, wherein broadcasting the small cell PCI list further comprises broadcasting the small cell PCI list in a radio resource control (RRC) information element (IE) system information block type4 (SIB4) configured to include a list of PCIs of intra-frequency neighboring small cells.

6. The method of claim 1, wherein the small cell PCI list includes a small cell category value, wherein the small cell category value specifies the PCIs associated with a small cell type.

7. The method claim 1, further comprising:
   broadcasting a closed subscriber group (CSG) range from the node to a wireless device.

8. The method of claim 1, wherein the small cell PCI list includes a validity time of the received small cell PCI list, wherein the validity time specifies an expiration time by which time to acquire an updated small cell PCI list.

9. At least one non-transitory machine readable medium comprising a plurality of instructions adapted to be executed to implement the method of claim 1.

10. A physical-layer cell identity (PCI) partitioning device for partitioning small cell PCIs at a node in a heterogeneous network (HetNet), comprising:
a PCI partitioning module configured to identify at least one small cell PCI of a plurality of small cells in a macro cell, and generate a small cell PCI list to include the at least one small cell PCI, wherein each small cell PCI is associated with a low power node (LPN) in the HetNet, wherein the PCI partitioning module is comprised of code that is located in one or more digital memory devices to be executed by one or more processors or the PCI partitioning module is implemented in one or more hardware circuits; and
a downlink broadcasting module configured to:
broadcast the small cell PCI list from the node to a wireless device; and
send a closed subscriber group (CSG) range from the node to the wireless device, wherein the wireless device is configured to search a reduced number of PCIs by searching an overlap of PCIs specified in the small cell PCI list and the CSG range or by excluding the PCIs specified in the CSG range from the PCIs specified in the small cell PCI list in the search,
wherein the downlink broadcasting module is comprised of code that is located in one or more digital memory devices to be executed by one or more processors or the downlink broadcasting module is implemented in one or more hardware circuits.

11. The PCI partitioning device of claim 10, wherein the small cell PCI list includes a plurality of non-consecutive small cell PCIs, a range of consecutive small cell PCIs, a PCI start value for a PCI and a PCI range for a number of PCIs to search after the PCI start value, a small cell category value, or combination thereof, wherein the small cell category value specifies the PCIs associated with a small cell type.

12. A method for searching a reduced number of small cell physical-layer cell identity (PCI) candidates in a search pool at a wireless device in a heterogeneous network (HetNet), comprising:
receiving a small cell PCI list from a serving node at a wireless device, wherein the small cell PCI list identifies at least one small cell PCI to search and each small cell PCI is associated with a low power node (LPN) in the HetNet;
searching a reduced number of PCIs based on the small cell PCI list;
receiving a closed subscriber group (CSG) range from the serving node; and
searching the reduced number of PCIs by searching an overlap of PCIs specified in the small cell PCI list and the CSCE range or by excluding the PCIs specified in the CSG range from the PCIS specified in the small cell PCI list in the search.

13. The method of claim 12, wherein the small cell PCI list includes one of:
a plurality of non-consecutive small cell PCIs; and
a range of consecutive small cell PCIs.

14. The method of claim 12, wherein the small cell PCI list includes a PCI start value for a PCI and a PCI range for a number of PCIs to search after the PCI start value.

15. The method of claim 12, wherein the small cell PCI list is broadcast in a mobility control information element (IE) SmallCellPhysCellIdRange, wherein a set of range elements of the IE SmallCellPhysCellIdRange have smaller values than a set of range elements of an IE PhysCellId-Range.

16. The method of claim 12, wherein the small cell PCI list is broadcast in a radio resource control (RRC) information element (IE) master information block (MIB) type 4 configured to include a list of PCIs of intra-frequency neighboring small cells.

17. The method of claim 12, wherein the small cell PCI list includes a small cell category value, wherein the small cell category value specifies the PCIs associated with a small cell type.

18. The method of claim 12, wherein searching the reduced number of PCIs is based on a validity time of the received small cell PCI list, wherein the validity time specifies an expiration time by which time to acquire an updated small cell PCI list.

19. The method of claim 12, wherein searching the reduced number of PCIs is triggered when a primary cell's reference signal received power (RSRP) or reference signal received quality (RSRQ) falls below a specified threshold.

20. The method of claim 12, wherein searching the reduced number of PCIs uses a reference signal received power (RSRP) or a reference signal received quality (RSRQ) derived from a reference signal (RS) selected from the group consisting of a primary synchronization signal (PSS), a secondary synchronization signal (SSS), and combinations thereof.

21. At least one non-transitory machine readable medium comprising a plurality of instructions adapted to be executed to implement the method of claim 12.

22. A physical-layer cell identity (PCI) searching device for searching a reduced number of small cell PCI candidates in a search pool at a wireless device in a heterogeneous network (HetNet), comprising:
a downlink receiving module configured to receive a small cell PCI list from a serving node at a wireless device, wherein the small cell PCI list identifies at least one small cell PCI to search and each small cell PCI is associated with a low power node (LPN) in the HetNet, wherein the downlink receiving module is comprised of code that is located in one or more digital memory devices to be executed by one or more processors or the downlink receiving module is implemented in one or more hardware circuits; and
a PCI searching module configured to search a reduced number of PCIs based on the small cell PCI list, wherein the PCI searching module is comprised of code that is located in one or more digital memory devices to be executed by one or more processors or the PCI searching module is implemented in one or more hardware circuits,
wherein the downlink receiving module is further configured to receive a closed subscriber group (CSG) range from the serving node, and the PCI searching module is further configured to search the reduced number of PCIs by searching an overlap of PCIs specified in the small cell PCI list and the CSG range or by excluding the PCIs specified in the CSG range from the PCIs specified in the small cell PCI list in the search.

23. The PCI searching device of claim 22, wherein the small cell PCI list includes a plurality of non-consecutive small cell PCIs, a range of consecutive small cell PCIs, a PCI start value for a PCI and a PCI range for a number of PCIs to search after the PCI start value, a small cell category value, or combination thereof, wherein the small cell category value specifies the PCIs associated with a small cell type.

24. The PCI searching device of claim 22, wherein the downlink receiving module is further configured to receive the small cell PCI list in a mobility control information element (IE) SmallCellPhysCellIdRange or a radio resource control (RRC) information element (IE) master information block (MIB) type 4 configured to include a list of PCIs of intra-frequency neighboring small cells, wherein a set of range elements of the IE SmallCellPhysCellIdRange have smaller values than a set of range elements of an IE PhysCellIdRange.

25. The PCI searching device of claim 22, further comprising:
   a timing module configured to count a validity time of the received small cell PCI list, wherein the validity time specifies an expiration time by which time to acquire an updated small cell PCI list, wherein the timing module is comprised of code that is located in one or more digital memory devices to be executed by one or more processors or the timing module is implemented in one or more hardware circuits.

26. The PCI searching device of claim 22, wherein the PCI searching module is further configured to search the reduced number of PCIs after a primary cell's reference signal received power (RSRP) or reference signal received quality (RSRQ) falls below a specified threshold.

27. The PCI searching device of claim 22, wherein the wireless device includes the PCI searching device and the wireless device is selected from the group consisting of a user equipment (UE) and a mobile station (MS), wherein the wireless device is configured to connect to at least one of a wireless local area network (WLAN), a wireless personal area network (WPAN), and a wireless wide area network (WWAN), wherein the wireless device includes an antenna, a touch sensitive display screen, a speaker, a microphone, a graphics processor, an application processor, internal memory, a non-volatile memory port, or combinations thereof.

* * * * *